United States Patent
Blameuser

(10) Patent No.: US 9,463,353 B1
(45) Date of Patent: Oct. 11, 2016

(54) BRASS INSTRUMENT MOUTHPIECE EMULATOR

(71) Applicant: Robert Frank Blameuser, Antioch, IL (US)

(72) Inventor: Robert Frank Blameuser, Antioch, IL (US)

( * ) Notice: Subject to any disclaimer, the term of this patent is extended or adjusted under 35 U.S.C. 154(b) by 0 days.

(21) Appl. No.: 14/682,916

(22) Filed: Apr. 9, 2015

(51) Int. Cl.
*G09B 15/00* (2006.01)
*A63B 23/03* (2006.01)
*G10D 9/02* (2006.01)

(52) U.S. Cl.
CPC ............... *A63B 23/03* (2013.01); *G09B 15/00* (2013.01); *G10D 9/026* (2013.01)

(58) Field of Classification Search
CPC ........ G09B 15/06; G09B 15/00; G09B 9/00; G09B 15/003; G09B 15/009; G09B 5/06; G10D 9/02; G10D 9/00; G10D 7/066; G10D 7/10; G10D 3/163; G10D 1/005; G10K 11/22; B29C 2045/14532; B29C 39/025; B29C 39/10; B29C 45/14065; B29C 45/14336; B29C 45/14344; B29C 45/14467; B29C 45/1676
USPC .................... 84/465, 468, 453, 383 R
See application file for complete search history.

(56) References Cited

U.S. PATENT DOCUMENTS

| 4,378,724 A * | 4/1983 | Lamart | G10D 9/00 84/398 |
| 2007/0068533 A1* | 3/2007 | Bierman | A61M 16/0488 128/207.17 |

* cited by examiner

*Primary Examiner* — Kimberly Lockett

(57) ABSTRACT

One embodiment of a brass musical instrument practice device (FIG. 3) consisting of a rimmed, (12) bowl shaped, cup (11) about 6 mm to 35 mm in diameter, and about 6 mm 35 mm deep with a 4 mm diameter hole (13) at the bottom of the cup to allow the player's air to escape. The rimmed cup is fitted into to a mounting (18) and is held against the player's lips by means of strap attachments (17) and two straps (14,15) that go around the player's head. This allows the musician to enjoy the lip muscle development benefits of practicing without having to use his hands and arms to hold either an instrument or a mouthpiece, (FIG. 1) thus freeing his hands for other use.

1 Claim, 4 Drawing Sheets

BRASS INSTRUMENT MOUTHPIECE EMULATOR

CROSS-REFERENCE TO RELATED APPLICATIONS

This Application claims the benefit of provisional patent application Ser. No. 61/978,039, filed 2014 Apr. 10 by the present inventor.

FEDERALLY SPONSORED RESEARCH

Not Applicable

SEQUENCE LISTING OR PROGRAM

Not Applicable

BACKGROUND

Prior Art

The inventor is not aware of any relevant prior art patents or non-patent literature documents.

Brass instruments are musical instruments whereby the sound is created by the player placing his lips against a circular mouthpiece, shown as FIG. 1. These have a rimmed concave cup, usually bowl shaped, and about 6 mm to slightly over 35 mm in diameter, and about 6 mm to 35 mm deep. Once the lips are against the mouthpiece, the player causes his lips to buzz, by blowing through the lips, which are pressed together. The resulting vibration is amplified by the instrument and emitted as a musical sound.

Musicians who play brass instruments must develop and maintain an embouchure, which is the area of the face that interfaces with the instrument. The embouchure includes the lips and surrounding soft tissue, including uniquely developed muscles. People unfamiliar with the instrument may simply blow into the mouthpiece, unaware that the lips must be buzzed to produce sound.

The range of the instrument refers to how many notes, going from lower pitched notes to higher pitched notes, an instrument can normally play. However, within the range of each brass instrument the range of each player is limited mainly by the strength of his individual embouchure. Generally, a stronger embouchure is required to play in the upper registers of a brass instrument. A stronger embouchure also facilitates playing in all registers.

Embouchure muscles are difficult to develop and maintain. Many instructors in the field suggest a half hour per day as the minimum that even a beginner should commit to practice in order to achieve even a modicum of proficiency. Those who seek to achieve a higher level of proficiency may commit to practice hours a day. Not being able to devote enough practice time can lead to player frustration, and may be a leading reason why brass musicians quit playing their instrument. Lack of satisfaction will ensue if embouchure muscles are not sufficiently developed and maintained to allow the musician to create the musical sounds to which they aspire.

In normal day to day activities the muscles used in the embouchure are not normally exercised sufficiently to maintain the muscle's strength and mass to play a brass instrument effectively, and therefore must be deliberately worked on a frequent basis. This is usually accomplished through playing (practicing) the instrument, which requires it to be held so the mouthpiece can be positioned against the player's lips. Alternatively, the mouthpiece alone (not connected to the instrument) can be held against the lips for the same purpose.

The portion of the instrument that contacts the lips is the mouthpiece FIG. 1, which can be inserted or removed from the tubular portion of the instrument where the player's air enters the instrument. The mouthpiece is usually metal but sometimes plastic. It is generally about 50 to 100 mm long, and has a cup 11, usually bowl shaped, that the player blows into, while causing his lips to vibrate. The cup's diameter and depth can be anywhere from about 6 mm for a small mouthpiece to about 35 mm depending on the size of the instrument. For example, trumpets have a smaller mouthpiece whereas a tuba has a much larger mouthpiece. There is a rim 12 around the cup anywhere from about 2 to 4 mm wide which allows the mouthpiece to be comfortably placed against the lips, and helps to create an air seal between the lips and the mouthpiece, and allows for lip vibration when the player blows.

At the bottom end of the cup is a small hole 13, about 3 to 5 mm diameter which allows air to pass through a hollow metal stem which has been inserted into the instrument, to enable it to produce sound.

The prior art requires the instrument, or at least the mouthpiece, to be held to the lips in order to accomplish practice for embouchure development. This generally precludes engaging in almost all other activities, as the arms are fully utilized.

If the player decides to use the mouthpiece alone for the purpose of practice, he still must hold the mouthpiece to his lips. In addition to requiring the use of at least one arm, this method also requires the arm holding the mouthpiece to be bent at a very acute angle, almost fully bent. Over extended periods of time, this can cause ulnar nerve entrapment at the elbow, also known as cubital tunnel syndrome.

At the elbow, the ulnar nerve travels through a tunnel of tissue (the cubital tunnel) that runs under a bump of bone at the inside of the elbow. This bony bump is called the medial epicondyle.

When a person bends his elbow, the ulnar nerve stretches around the boney ridge of the medial epicondyle. Because this can irritate the nerve, if a person keeps their elbow bent for long periods or repeatedly bends his elbow it can sometimes cause painful symptoms. To some extent, this disadvantage can also be experienced by someone holding a complete instrument, depending on the design of that instrument. For example, a very small trumpet may require an acute elbow bend, as may the left arm as it holds a trombone.

As far as sound goes, practice using a complete instrument, that is, a brass instrument and mouthpiece combination, usually generates a sound that can potentially be heard for hundreds of feet, and may be annoying to people within hearing range. Practice for embouchure development may not be musical in its nature, or in the musician's intent. For example, it may be a long tone, which is simply the same note held for thirty seconds or so. It may be lip slurs, which are notes whose pitch is changed by tightening and then loosening the lips repeatedly. This sound can be dampened by use of a mute (not shown), which is a sound modifying device inserted into the sound release orifice of the instrument, called a bell. However, mutes may not always be available.

Thus, the main disadvantages of the prior art are the need to have the actual instrument available to practice, the need to hold the instrument, or at least the mouthpiece, thus loosing use of one or both arms, the potential discomfort caused by keeping the arm acutely bent for extended periods, and the creation of a potentially annoying sound.

SUMMARY

In accordance with one embodiment, a brass instrument mouthpiece emulator FIG. 3, which is the cup 11 and rim 12 portion of a brass instrument mouthpiece which can be fitted with straps 14, 15 and worn around the musician's head. Hereafter this will be called simply mouthpiece emulator.

Advantages

Since much of mere embouchure development, as opposed to practicing for other techniques, (phrasing, fingerings, etc.) only involves the lips and to some extent, breath, there is no reason, other than the arms being constrained to hold the instrument, that other activities cannot be conducted simultaneously.

One advantage presented here is to allow the brass musician to engage in many other activities while simultaneously working his embouchure by freeing his arms, thus allowing him to utilize time more efficiently. Examples of activities that can be undertaken while using the mouthpiece emulator include household chores, exercise, reading, driving, bathing, watching TV, internet activities, etc. In fact, almost any human activity that does not involve the mouth, such as speaking or eating, can be conducted while simultaneously using the mouthpiece emulator to practice.

Thus, the mouthpiece emulator provides the new and unexpected benefit of allowing a brass instrument player to engage in embouchure development practice without the need to hold his instrument or instrument mouthpiece.

As an additional advantage, if the user is travelling to a destination which would make transporting the brass instrument inconvenient, the mouthpiece emulator would provide a convenient means of that player continuing to maintain his embouchure. Thus, the mouthpiece emulator provides the new and unexpected benefit of allowing a brass instrument player to engage in embouchure development practice without the need to be in proximity of his instrument or mouthpiece.

Since pressure must be applied between the mouthpiece and the lips to produce lip vibrations of a quality necessary to produce a suitable sound, and since increasing this pressure makes it easier to produce these vibrations, many players compensate for a weak embouchure by using extra pressure. This can be especially problematic if the player is wearing orthodontic braces, as the pressure forcing the mouthpiece against the lips can cause braces to cut into the lips. Since the mouthpiece emulator is not intended to be a music producing device, it can be used with minimal pressure and still fulfill the purpose of allowing practice. This provides the new and unexpected benefit of allowing embouchure practice with minimal pressure, and could be especially advantageous to a player wearing braces.

Since the mouthpiece emulator allows for the arms to be in a straight position while practicing for embouchure development, and in fact provides full body mobility while practicing, it provides the new and unexpected benefit of being able, while practicing, to avoid any position that could make the player physically uncomfortable.

The mouthpiece emulator will afford the musician additional opportunities to have time to spend working the embouchure. This may result in marked increase in playing ability, which could in turn translate into increased income, educational, and/or performance opportunities for the user. Additionally, being able to use time simultaneously for both embouchure development and other activities could increase overall quality of life for the user.

DRAWING

Figures

FIG. 1 Prior Art shows a cut away view of a common brass instrument mouthpiece.

REFERENCE NUMERALS

11 Cup
12 Rim
13 Orifice
14 Bottom Strap
15 Top Strap
16 Strap Adjustment Buckle
17 Strap Attachment
18 Mounting Unit

DETAILED DESCRIPTION

The present embodiment relates to musical instrument accessories in general, and more particularly to a lip or embouchure development tool for musicians who play brass instruments.

Figure 1:
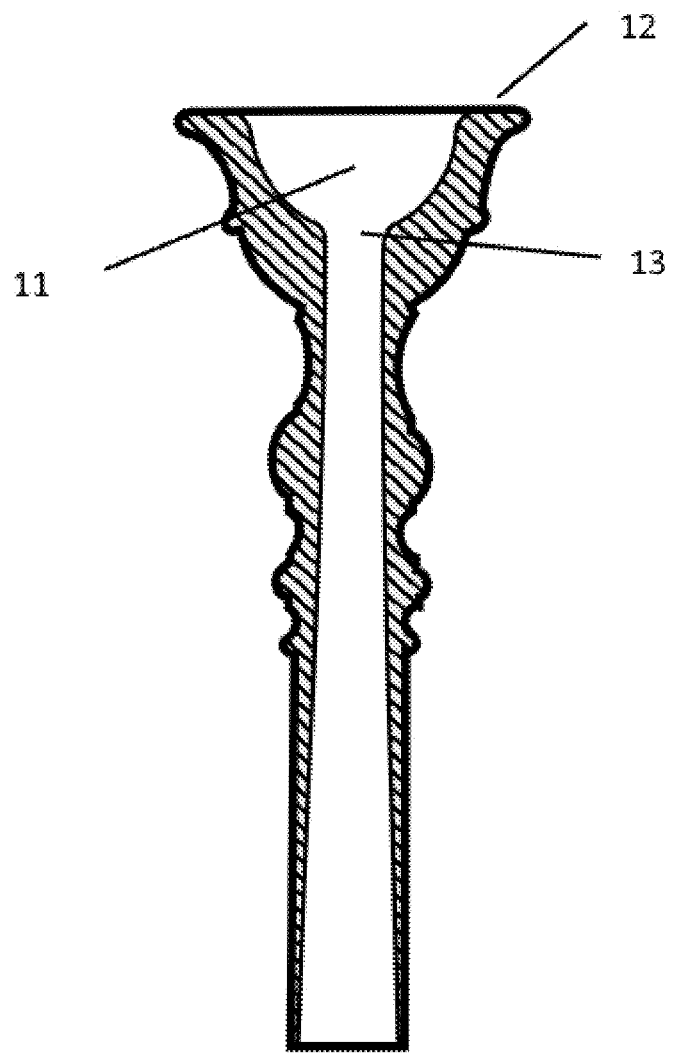
Figure 2:
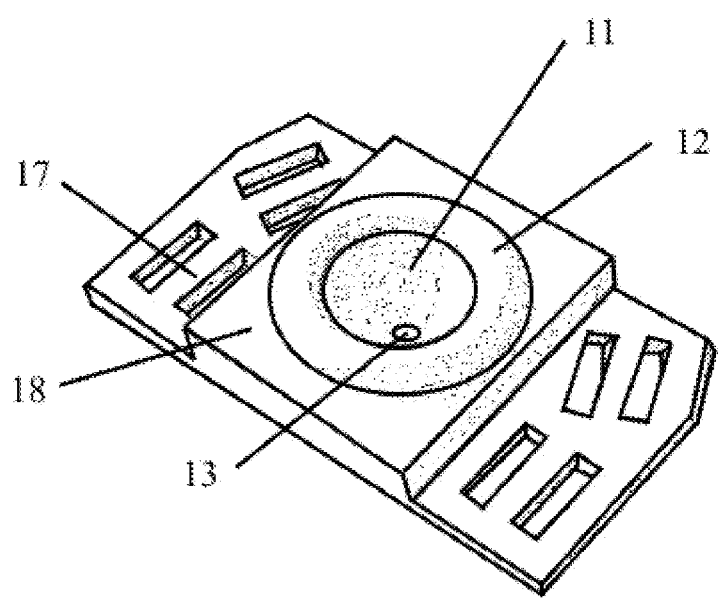
FIG. 2 shows a shaded perspective view of an embodiment without straps attached.
Figure 3:
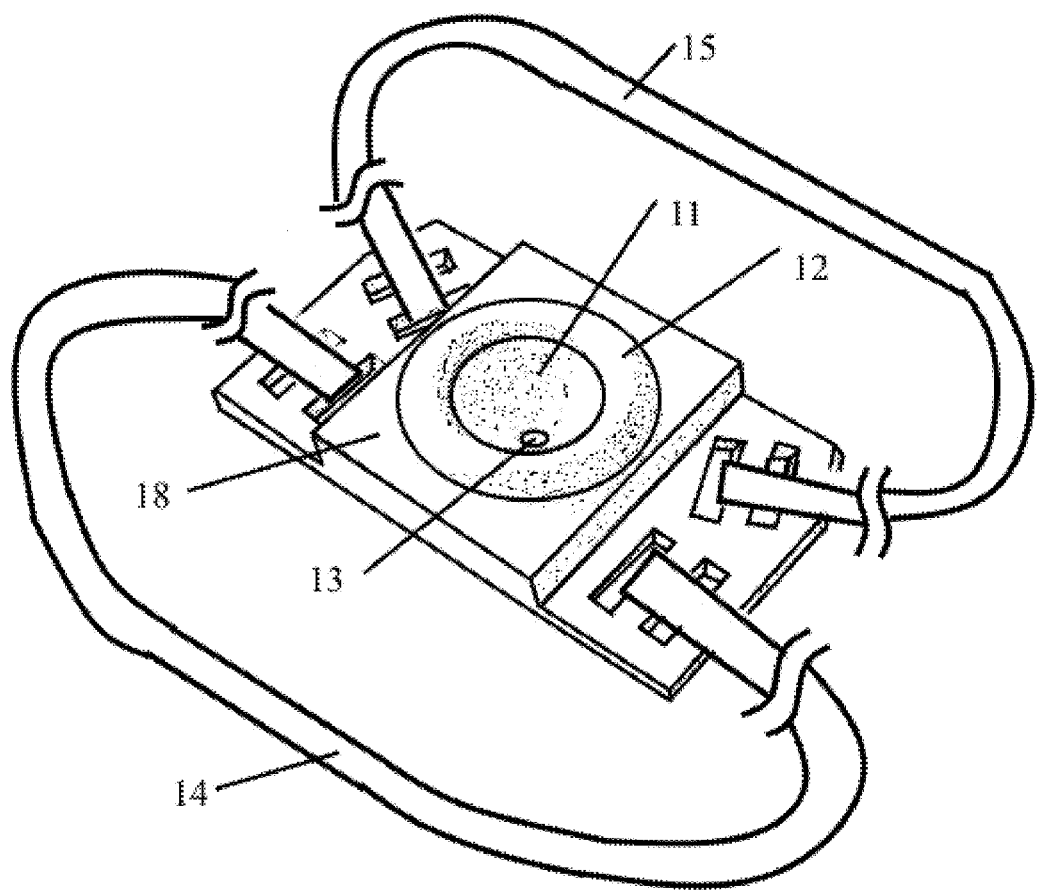
FIG. 3 shows a shaded perspective view of an embodiment with straps attached.
Figure 4:
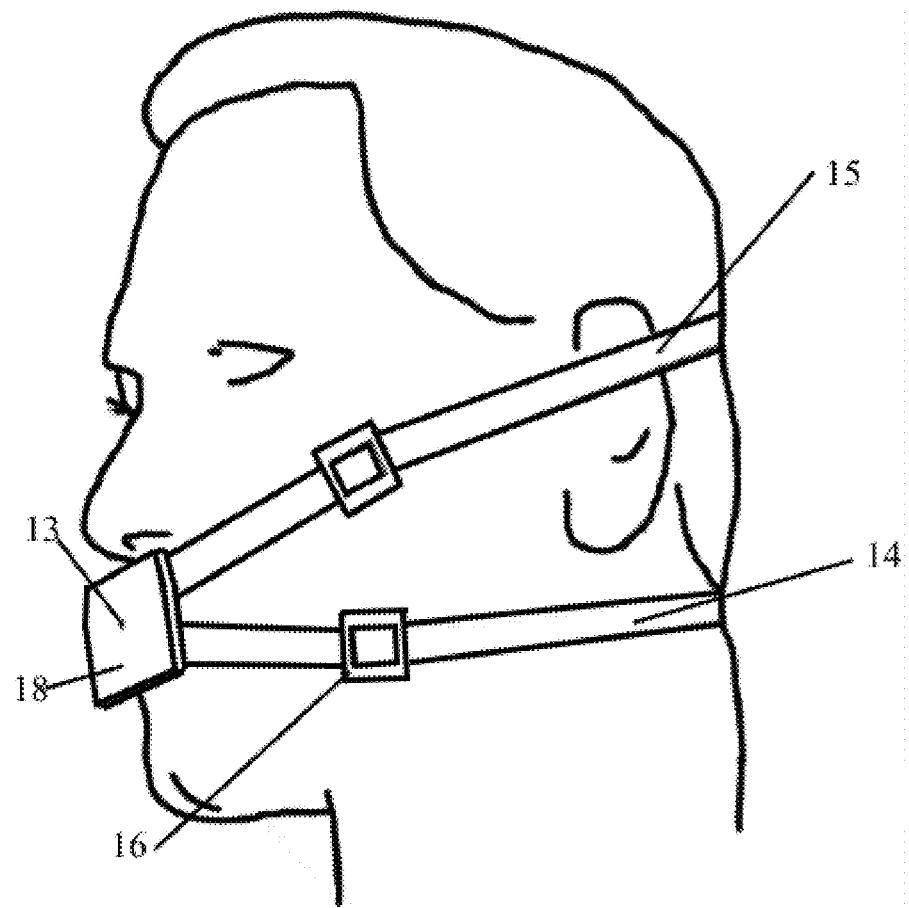
FIG. 4 shows an embodiment as worn by a user, with the rim and cup against the user's lips.

One embodiment of the mouthpiece emulator, is shown in FIGS. 2, 3 and 4. The device has a rimmed, bowl shaped, cup 11 which can range from about 3 mm to 35 mm wide, and from about 3 mm to 35 mm deep, depending on the size of the mouthpiece the user wishes to emulate. The cup has a rim 12 about 5 mm wide. At the bottom of the cup is an orifice 13 about 3 mm to 5 mm in diameter which allows air to escape. The rim of the cup is intended to contact the lips, so that the user can blow into the cup.

The cup is embedded in a mounting unit, 18, about 6.5 cm to 7 cm wide, and about 4 to 5 cm high which is also fashioned with attachments 17 for two elastic straps 14,15 about 65 cm long. One strap 14 is intended to go behind the neck, and another strap 15 around the back of the head, near the crown of the head, as shown in FIG. 4. This enables the mouthpiece emulator to be held against the lips by virtue of the straps alone. Adjustment buckles 16 on the straps allow the user to adjust the pressure against the lips by loosening or tightening the straps.

In this embodiment the mouthpiece emulator can be made out of any hard nonporous material including plastic or metal. Methods of manufacture can include 3 D printing, plastic molding, machining, or the cup 11 and rim 12 portion can be turned on a lathe or molded separately and then fastened to the mounting unit. This method would allow for different materials to be used for the rimmed cup and mounting unit.

Alternative Embodiments

Additional embodiments can include changes to color, size or materials, or manner in which the mouthpiece emulator is held to the lips. For example, more than two straps may be employed. Or, other materials that serve the same function as the straps may be used.

Operation

To operate the mouthpiece emulator, one begins by holding the mouthpiece emulator FIG. 3 in front of their face with the cup side facing their lips.

They then pull the bottom strap 14 over their head to where it will come to rest at the back of the neck. The top strap 15 is then pulled over the head to rest at the back of the crown. (FIG. 4).

This will draw the mouthpiece emulator against the face.

The cup portion should be situated so that it is over the lips in the player's normal playing position. The straps can be adjusted using adjustment buckles 16 for comfort and to adjust the pressure the unit places against the lips.

At this point, lip buzzing can occur and the mouthpiece emulator is fully operational. Although the mouthpiece emulator is not intended to be a musical instrument, it does produce a tone when a player blows through it and allows his lips to buzz. The pitch is adjustable in the same way as with the brass instrument mouthpiece. Thus, to practice the user may elect to play along with an outside music source such as a radio, or may simply play tones on his own. Holding tones or changing pitch will exercise the lip muscles and assist in embouchure development. To remove the mouthpiece emulator, simply perform the above steps in reverse order.

CONCLUSIONS, RAMIFICATIONS, AND SCOPE

Accordingly, the reader will see that the brass instrument mouthpiece emulator can be used to develop the brass musician's embouchure without the need to employ the use of his hands or arms, other than to position or remove the device. It has numerous advantages over using either the mouthpiece alone, or attached to an actual instrument in that:

- it permits the player to practice embouchure development while keeping the hands and arms free.
- it can be conveniently carried and stored, and brought to places where it may not be feasible to bring an instrument for practice.
- it can allow for quieter practice opportunity to avoid disturbing others.
- it can create opportunities to practice to develop the embouchure where none existed by allowing other tasks to be engaged in simultaneously.
- It makes it possible to utilize time spent doing other activities also as practice time simultaneously. Increasing practice time is a clearly identifiable and well known way to increase musical proficiency, which in turn creates other valuable opportunities.

Although the description above contains many specificities, these should not be construed as limiting the scope of the embodiments but as merely providing illustrations of some of several embodiments. For example the cup can have shapes that are not symmetrical or bowl shaped and the rim can be made flat or with varying degrees of curvature. The cup and rim need not be made of the same material as the mounting. The method of holding the device to the head need not involve straps per se, but could involve some other method, such as elastic netting.

I claim:

1. A device for strengthening a brass musical instrument embouchure comprising:
   a concave cup with a depth ranging from about 6 mm to about 35 mm and a width ranging from about 6 mm to 35 mm, said cup having a rim, said rim being between about 2 mm to about 6 mm in width, said cup having an orifice at the end opposite the rim, said orifice being large enough to allow air blown into said cup to escape said cup, yet small enough to partially restrict the air blown through said orifice, said cup having a contiguous mounting unit connecting said cup to a plurality of straps capable of being adjusted around a human's head in such a way as to cause said rim to be held in a contact against the human's facial lips, such that once positioned on the human's facial lips no support beyond that provided by the plurality of straps and the mounting unit is required to maintain said contact.

* * * * *